(12) United States Patent
Su et al.

(10) Patent No.: US 11,189,890 B2
(45) Date of Patent: Nov. 30, 2021

(54) CAP ASSEMBLY AND SECONDARY BATTERY

(71) Applicant: Contemporary Amperex Technology Co., Limited, Fujian (CN)

(72) Inventors: Huasheng Su, Fujian (CN); Shoujun Huang, Fujian (CN); Yulian Zheng, Fujian (CN)

(73) Assignee: Contemporary Amperex Technology Co.. Limited, Ningde (CN)

( * ) Notice: Subject to any disclaimer, the term of this patent is extended or adjusted under 35 U.S.C. 154(b) by 0 days.

(21) Appl. No.: 17/137,390

(22) Filed: Dec. 30, 2020

(65) Prior Publication Data

US 2021/0119307 A1 Apr. 22, 2021

Related U.S. Application Data

(63) Continuation of application No. 16/826,228, filed on Mar. 21, 2020.

(30) Foreign Application Priority Data

Jul. 9, 2019 (CN) .......................... 201921066979.7

(51) Int. Cl.
*H01M 50/543* (2021.01)
*H01M 50/183* (2021.01)
(Continued)

(52) U.S. Cl.
CPC ....... *H01M 50/543* (2021.01); *H01M 50/172* (2021.01); *H01M 50/183* (2021.01); *H01M 50/557* (2021.01)

(58) Field of Classification Search
CPC ............. H01M 50/147; H01M 50/172; H01M 50/578; H01M 50/183; H01M 50/543;
(Continued)

(56) References Cited

U.S. PATENT DOCUMENTS

| 2012/0070705 A1* | 3/2012 | Kim ................. H01M 10/0431 429/61 |
| 2017/0040579 A1* | 2/2017 | Guen ................. H01M 50/543 |

(Continued)

FOREIGN PATENT DOCUMENTS

WO WO-2017115854 A1 * 7/2017 .......... H01M 2/0404

*Primary Examiner* — Miriam Stagg
*Assistant Examiner* — Lilia Nedialkova
(74) *Attorney, Agent, or Firm* — Law Offices of Liaoteng Wang

(57) ABSTRACT

The disclosure relates to a cap assembly and a secondary battery. The cap assembly includes: a cap plate including a main portion and a convex portion, the main portion including a first surface, a second surface and an electrode lead-out hole; an electrode terminal including an extension portion that extends beyond a hole wall of the electrode lead-out hole and extends in a circumferential direction of the electrode lead-out hole to form a ring structure, and the extension portion is arranged on a side of the first surface away from the second surface; and a sealing ring at least partially disposed between the extension portion and the main portion. The convex portion is disposed on the second surface and around the electrode lead-out hole, and a top surface of the convex portion extends out of the second surface.

18 Claims, 9 Drawing Sheets

(51) Int. Cl.
*H01M 50/172* (2021.01)
*H01M 50/557* (2021.01)

(58) Field of Classification Search
CPC ............ H01M 50/553; H01M 50/547; H01M 50/557; Y02E 60/10
See application file for complete search history.

(56) References Cited

U.S. PATENT DOCUMENTS

| | | | |
|---|---|---|---|
| 2017/0194617 A1* | 7/2017 | Baik | H01M 50/172 |
| 2019/0006639 A1* | 1/2019 | Ito | H01G 11/78 |
| 2019/0067728 A1* | 2/2019 | Kwak | H01M 50/531 |
| 2019/0288269 A1* | 9/2019 | Guen | H01M 50/147 |

* cited by examiner

CAP ASSEMBLY AND SECONDARY BATTERY

CROSS-REFERENCE TO RELATED APPLICATION

This application is a continuation application of U.S. application Ser. No. 16/826,228, filed on Mar. 21, 2020, which claims priority to Chinese Patent Application No. 201921066979.7 filed on Jul. 9, 2019, the content of which are incorporated herein by reference in their entirety.

FIELD

The disclosure relates to the technical field of battery, and in particular to a cap assembly, a secondary battery and an electric apparatus.

BACKGROUND

Lithium ion secondary batteries have been widely used in the fields of hybrid vehicles and electric vehicles. This is because it has high energy, high capacity and high power. The secondary battery includes a cap plate, an electrode terminal disposed on the cap plate, a sealing ring for sealing the cap plate and the electrode terminal, and a current collector connected to the electrode terminal. The cap plate includes an electrode lead-out hole. The electrode terminal covers the electrode lead-out hole.

SUMMARY

According to embodiments of the disclosure, there is provided a cap assembly and a secondary battery. The convex portion of the cap assembly may increase the strength and rigidity of the section of the main portion close to the electrode lead-out hole, and reduce the possibility that the section is deformed when it is subject to an elastic restoring force of the sealing ring.

In one aspect, embodiments of the disclosure provide a cap assembly for a secondary battery. The cap assembly includes: a cap plate, an electrode terminal and a sealing ring. The cap plate includes a main portion and a convex portion. The main portion includes a first surface and a second surface that are disposed opposite to each other in a thickness direction of the main portion and an electrode lead-out hole passing through the first surface and the second surface. The electrode terminal connects to the main portion and covers the electrode lead-out hole. The electrode terminal includes an extension portion that extends beyond a hole wall of the electrode lead-out hole in a radial direction of the electrode lead-out hole, the extension portion extends in a circumferential direction of the electrode lead-out hole to form a ring structure, and the extension portion is arranged on a side of the first surface away from the second surface. The sealing ring is at least partially disposed between the extension portion and the main portion to seal the electrode lead-out hole. The convex portion is disposed on the second surface and around the electrode lead-out hole, and a top surface of the convex portion extends out of the second surface.

According to an aspect of embodiments of the disclosure, the convex portion has a thickness of 0.01 mm to 2 mm.

According to an aspect of embodiments of the disclosure, the convex portion includes a ring body disposed around the electrode lead-out hole.

According to an aspect of embodiments of the disclosure, the convex portion includes two or more bosses which are provided at intervals in the circumferential direction of the electrode lead-out hole.

According to an aspect of embodiments of the disclosure, the top surface includes a planar region and/or a beveled region.

According to an aspect of embodiments of the disclosure, the cap assembly further includes a fixing component, the fixing component is welded to the cap plate and forms a welding zone, and along the radial direction, the convex portion exceeds the welding zone or the convex portion is flush with an outermost boundary of the welding zone.

According to an aspect of embodiments of the disclosure, the cap plate includes a recess surrounding the electrode lead-out hole, the fixing component is welded to a side wall of the recess, a section of the main portion outside of the recess has a maximum thickness D, and there is a maximum thickness H between a bottom wall of the recess and the top surface, $0.4 \leq H/D \leq 0.9$.

According to an aspect of embodiments of the disclosure, the cap plate includes a recess surrounding the electrode lead-out hole, the fixing component is welded to a side wall of the recess, and there is a maximum thickness H between a bottom wall of the recess and the top surface, $0.7 \text{ mm} \leq H \leq 1.5 \text{ mm}$.

According to an aspect of embodiments of the disclosure, the cap plate includes a recess surrounding the electrode lead-out hole, the fixing component is welded to a side wall of the recess, a portion of the sealing ring between the electrode terminal and the main portion has a maximum compression S, and there is a maximum thickness H between a bottom wall of the recess and the top surface, $S=kH$, and $0<k<1$.

According to an aspect of embodiments of the disclosure, along the radial direction, an outer peripheral surface of the sealing ring is arranged outside of an innermost edge of the convex portion.

According to an aspect of embodiments of the disclosure, the second surface is smoothly transitioned and connected to an outer surface of the convex portion.

According to an aspect of embodiments of the disclosure, the cap assembly further includes an insulating component disposed on a side of the second surface away from the first surface, the insulating component includes a recessed portion in which the convex portion is at least partially arranged.

In another aspect, embodiments of the disclosure provide a secondary battery including: a case including an opening; an electrode assembly disposed in the case; and a cap assembly according to the above embodiments for sealing the opening. The second surface faces the electrode assembly.

According to another aspect of embodiments of the disclosure, the cap assembly further includes an insulating component disposed on a side of the second surface away from the first surface, the secondary battery further includes a current collector which includes a main body and an extending portion connected to each other, the main body is arranged on a side of the insulating component away from the second surface, and the extending portion extends into the electrode lead-out hole and is connected to the electrode terminal; and along an axial direction of the electrode lead-out hole, there is a first gap between the main body and the insulating component.

According to another aspect of embodiments of the disclosure, the cap assembly further includes an insulating component disposed on a side of the second surface away from the first surface, and along an axial direction of the electrode lead-out hole, there is a second gap between the insulating component and the cap plate.

In another aspect, embodiments of the disclosure provide an electric apparatus including a secondary battery according to the above embodiments.

BRIEF DESCRIPTION OF THE DRAWINGS

Features, advantages, and technical effects of exemplary embodiments of the disclosure will be described below with reference to accompanying drawings.

Figure 1:
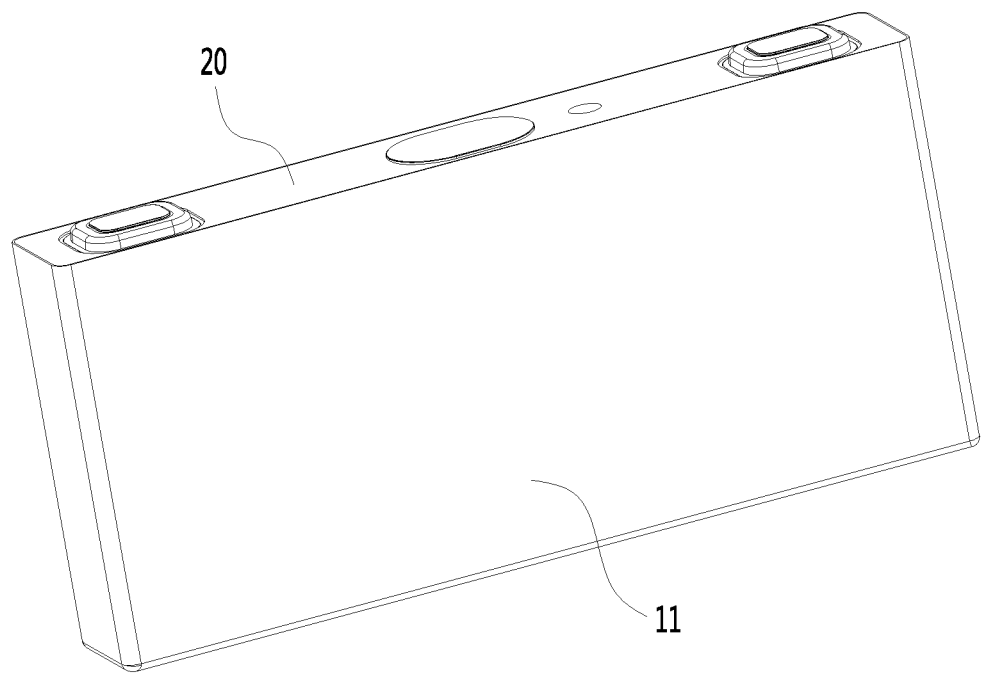
FIG. 1 is a structural schematic diagram of a secondary battery according to an embodiment of the disclosure.

The views are not necessarily plotted in actual proportion in the drawings.

REFERENCE SIGNS IN THE DRAWINGS 10 secondary battery;
11 case;
12 electrode assembly;
20 cap assembly;
30 cap plate;
31 main portion;
311 first surface;
312 second surface;
313 electrode lead-out hole;
32 convex portion;
321 ring body;
322 boss;
323 top surface;
324 innermost edge;
33 recess;
331 bottom wall;
40 sealing ring;
50 terminal assembly;
51 fixing component;
52 electrode terminal;
52a extension portion;
60 insulating component;
61 recessed portion;
70 current collector;
71 main body;
80 extending portion;
80 first gap;
90 second gap;
99 welding zone;
X radial direction;
Y axial direction.

DETAILED DESCRIPTION

Below, embodiments of the disclosure will be further described in detail with reference to the drawings and embodiments. The detailed description according to the embodiments and the accompanying drawings are intended to exemplary illustrate the principles of the disclosure and are not intended to limit the scope of the disclosure. That is, the disclosure is not limited to the described embodiments.

In the description of the disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the disclosure and simplifying the description, and is not intended to indicate or imply that the device or component referred to has a particular orientation, is constructed and operated in a particular orientation, and therefore cannot be understood to be a limitation of the disclosure. Moreover, the terms "first", "second", and the like are configured for descriptive purposes only and are not to be construed as indicating or implying relative importance.

In the description of the disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the disclosure can be understood by the person skilled in the art according to actual circumstance.

The prior art suffers from at least the following problem: since the cap plate and the electrode terminal are hermetically connected by the sealing ring, the compressed portion of the sealing ring produces an elastic restoring force. The elastic restoring force of the sealing ring may react on the cap plate, so that the portion of the cap plate close to the electrode lead-out hole may be deformed, which causes a safety hazard in the use of the secondary battery.

For better understanding of the disclosure, embodiments of the disclosure will be described below in detail with reference to FIGS. 1 to 15.

Figure 2:
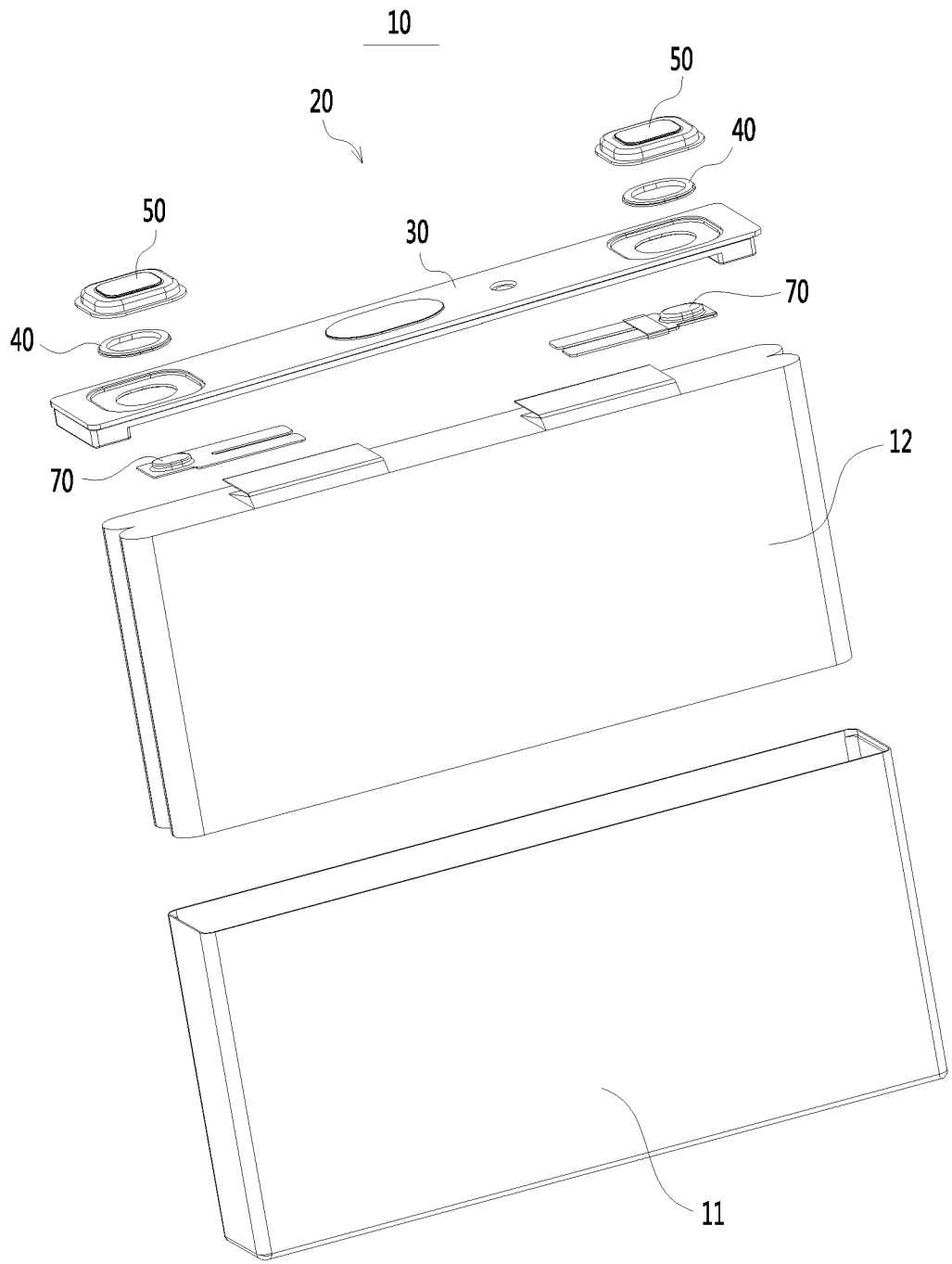
FIG. 2 is an exploded structural view of a secondary battery according to an embodiment of the disclosure.

As shown in FIG. 1 and FIG. 2, a secondary battery 10 according to embodiments of the disclosure includes a case 11, an electrode assembly 12 disposed in the case 11 and a cap assembly 20 hermetically connected to the case 11. According to embodiments of the disclosure, the secondary battery 10 may be applied in an electric apparatus, such as hybrid vehicle or electric vehicle.

The case 11 according to embodiments of the disclosure is formed in a shape of a rectangular cuboid or in other shapes. The case 11 includes an internal space in which the electrode assembly 12 and electrolyte are accommodated, and an opening in communication with the internal space. The case 11 may be made of a material such as aluminum, aluminum alloy or plastic.

The electrode assembly 12 according to embodiments of the disclosure may form a body by stacking a first electrode plate, a second electrode plate, and a separator between the first electrode plate and the second electrode plate together or spirally winding the first electrode plate, the second electrode plate and the separator around a winding axis. The separator is an insulator between the first electrode plate and the second electrode plate. The electrode assembly 12 according to the embodiment has a flat overall shape with predetermined thickness, height and width. In the embodiment, the description is made by exemplarily taking the first electrode plate as a positive electrode plate and the second electrode plate as a negative electrode plate. Similarly, in other embodiments, the first electrode plate may be a negative electrode plate, and the second electrode plate may be a positive electrode plate. Furthermore, a positive active material is coated on a coating region of the positive electrode plate, while a negative active material is coated on a coating region of the negative electrode plate. A plurality of uncoated regions extending from the coating regions of the body serve as tabs. The electrode assembly 12 includes two tabs, i.e., a positive tab and a negative tab. The positive tab extends from the coating region of the positive electrode plate while the negative tab extends from the coating region of the negative electrode plate.

Figure 5:
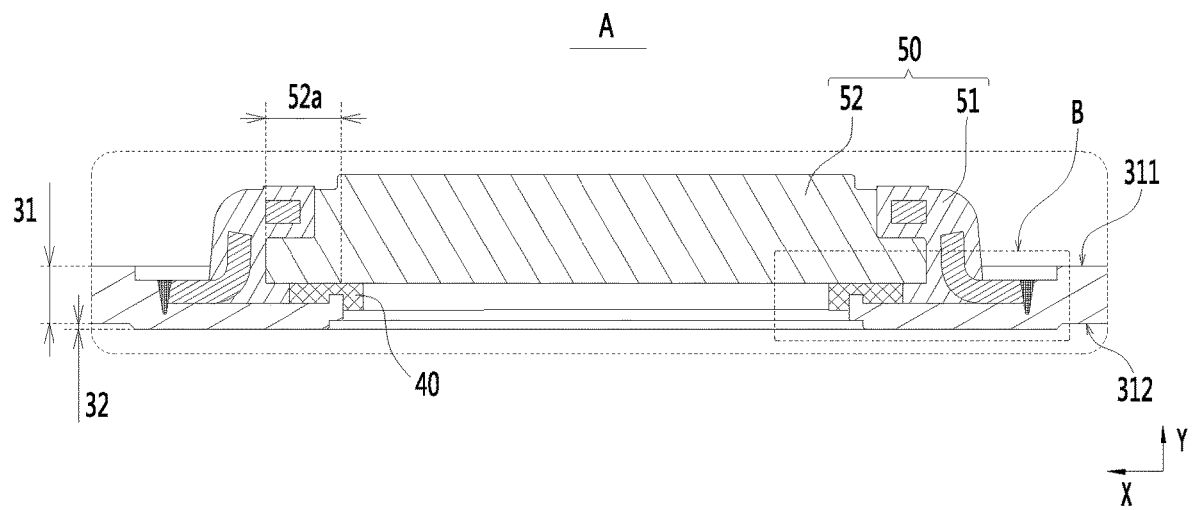
FIG. 5 is an enlarged view of a portion A in FIG. 4.

As shown in FIG. 2, the cap assembly 20 according to embodiments of the disclosure includes a cap plate 30 and a terminal assembly 50 connected to the cap plate 30. The cap plate 30 may cover the opening of the case 11 and hermetically connect with the case 11 to enclose the electrode assembly 12 within the case 11. The cap plate 30 includes an electrode lead-out hole 313. In an embodiment, as shown in FIG. 5, the terminal assembly 50 includes a fixing component 51 and an electrode terminal 52. The electrode terminal 52 is connected to a main portion 31 and covers the electrode lead-out hole 313. The electrode terminal 52 is connected to the cap plate 30 through the fixing component 51. The electrode assembly 12 may be connected to the electrode terminal 52 through a current collector. The fixing component 51 includes a hollow cavity in which the electrode terminal 52 is accommodated. The hollow cavity of the fixing component 51 and the electrode lead-out hole 313 are correspondingly disposed in an axial direction Y of the electrode lead-out hole 313.

Figure 3:
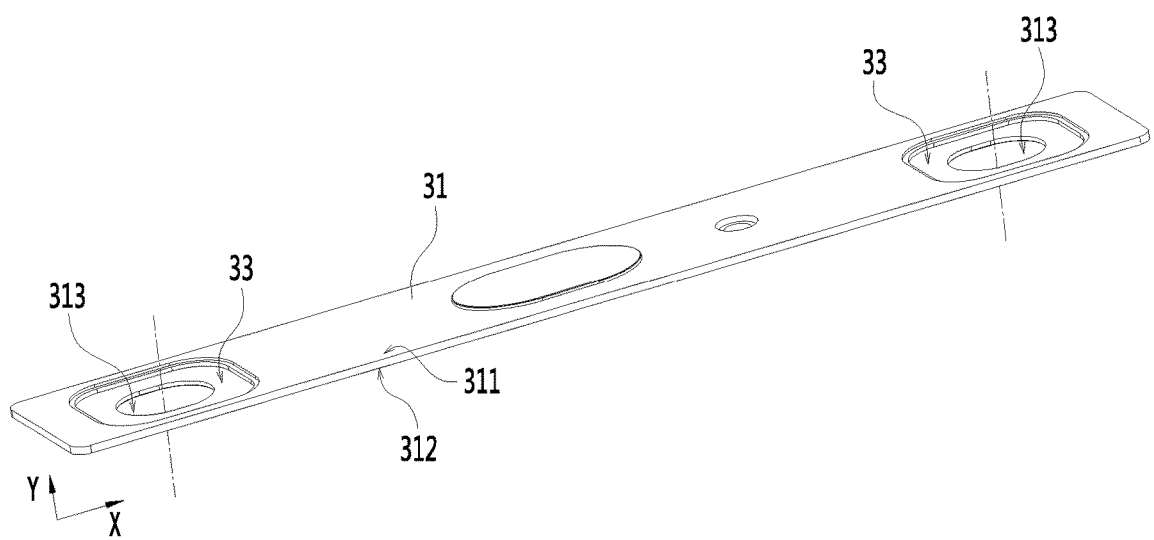
FIG. 3 is a structural schematic diagram of a cap plate according to an embodiment of the disclosure.
Figure 4:
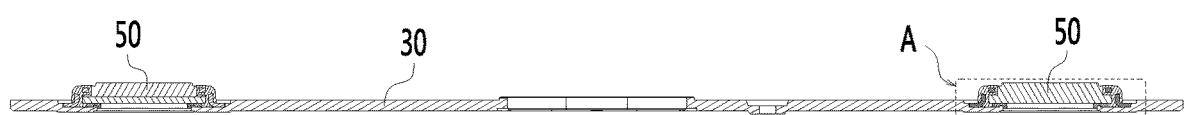
FIG. 4 is a structural sectional view of a cap assembly according to an embodiment of the disclosure.

As shown in FIGS. 3 to 5, the cap plate 30 includes a plate-shaped main portion 31 and a convex portion 32. The main portion 31 includes a first surface 311 and a second surface 312 which are disposed opposite to each other in its thickness direction. An electrode lead-out hole 313 is provided in the main portion 31. The electrode lead-out hole 313 passes through the first surface 311 and the second surface 312. The thickness direction of the main portion 31 is the same as the axial direction Y of the electrode lead-out hole 313. The cap plate 30 is hermetically connected to the case 11 through the main portion 31. When the cap assembly 20 is applied to a secondary battery, it may be connected to the case 11 while the second surface 312 of the main portion 31 is adapted to face the electrode assembly 12. Optionally, the cap plate 30 is welded to the case 11 through the main portion 31. The convex portion 32 is disposed on the second surface 312 of the main portion 31. The convex portion 32 is provided around the electrode lead-out hole 313. The convex portion 32 protrudes in the axial direction Y of the electrode lead-out hole 313 away from the first surface 311.

Figure 6:
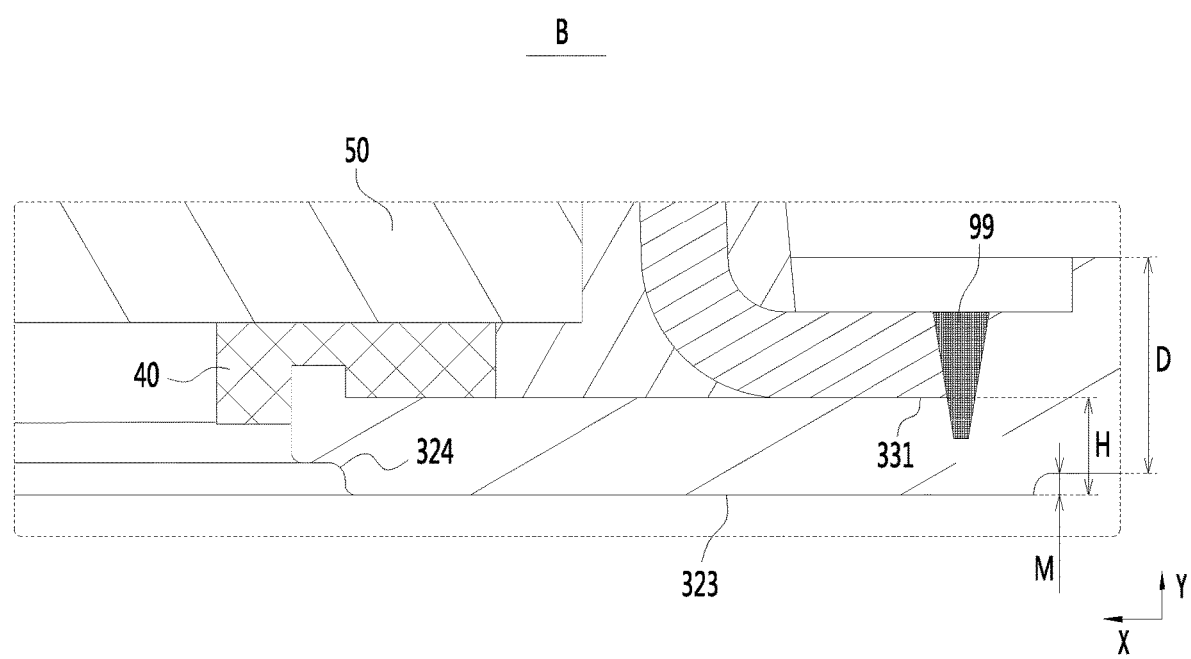
FIG. 6 is an enlarged view of a portion B in FIG. 5.

As shown in FIG. 6, a top surface 323 of the convex portion 32 protrudes out of the second surface 312. The convex portion 32 has a thickness M of 0.01 mm to 2 mm. The thickness M of the convex portion 32 refers to a maximum vertical distance at which the convex portion 32 protrudes from the second surface 312 in the thickness direction. Optionally, the convex portion 32 of the cap plate 30 and the main portion 31 are integrally formed.

As shown in FIG. 2 and FIG. 5, the cap assembly 20 further includes a sealing ring 40. The sealing ring 40 extends in a circumferential direction of the electrode lead-out hole 313. A center hole of the sealing ring 40 is disposed corresponding to the electrode lead-out hole 313. The electrode terminal 52 includes an extension portion 52a that extends beyond a hole wall of the electrode lead-out hole 313 in a radial direction X of the electrode lead-out hole 313. The extension portion 52a extends in the circumferential direction of the electrode lead-out hole 313 to form a ring structure. The extension portion 52a is arranged on a side of the first surface 311 away from the second surface 312. When the cap assembly 20 is applied to a secondary battery, the extension portion 52a is arranged on the side of the main portion 31 away from the electrode assembly 12. After the terminal assembly 50 is connected and fixed to the cap plate 30, the sealing ring 40 is at least partially disposed between the extension portion 52a and the main portion 31 to seal the electrode lead-out hole 313. The extension portion 52a of the electrode terminal 52 and the main portion 31 collectively compress a portion of the sealing ring 40 which is disposed between the extension portion 52a and the main portion 31 in the axial direction Y of the electrode lead-out hole 313. Since the compressed portion of the sealing ring 40 produces an elastic restoring force, the elastic restoring force acts on a section of the main portion 31 corresponding to the compressed portion and causes the section to have a trend of deformation in the axial direction Y of the electrode lead-out hole 313. After the convex portion 32 is disposed on the main portion 31, the convex portion 32 helps to enhance the deformation resistance of the section of the main portion 31 corresponding to the compressed portion, and reduces the possibility of deformation or breakage due to the elastic restoring force, thereby reducing the possibility of seal failure.

The cap assembly 20 according to the embodiment of the disclosure includes a cap plate 30, an electrode terminal 52 and a sealing ring 40. The cap plate 30 includes a main portion 31 and a convex portion 32. The convex portion 32 surrounds the electrode lead-out hole 313 disposed in the main portion 31. The electrode terminal 52 includes an extension portion 52a. The portion of the sealing ring 40 disposed between the extension portion 52a and the main portion 31 produces an elastic restoring force in the axial direction Y of the electrode lead-out hole 313. This elastic restoring force acts on a section of the main portion 31 close to the electrode lead-out hole 313. The convex portion 32 may increase the strength and rigidity of the section of the main portion 31 close to the electrode lead-out hole 313, and reduce the deformation possibility of the section of the main portion 31 close to the electrode lead-out hole 313 due to a force in the axial direction Y of the electrode lead-out hole 313, thereby reducing the possibility of seal failure and improving the safety in use of the secondary battery. In addition, since the convex portion 32 may locally increase the strength and rigidity of the easily deformable region on the main portion 31, the section of the main portion 31 outside the convex portion 32 may be reduced in size in the thickness direction. Thereby, as compared with the prior art, the cap plate 30 according to the embodiment includes a structure in which the cap plate 30 is more compact in its thickness direction, which is advantageous for increasing the energy density of the secondary battery 10.

Figure 7:
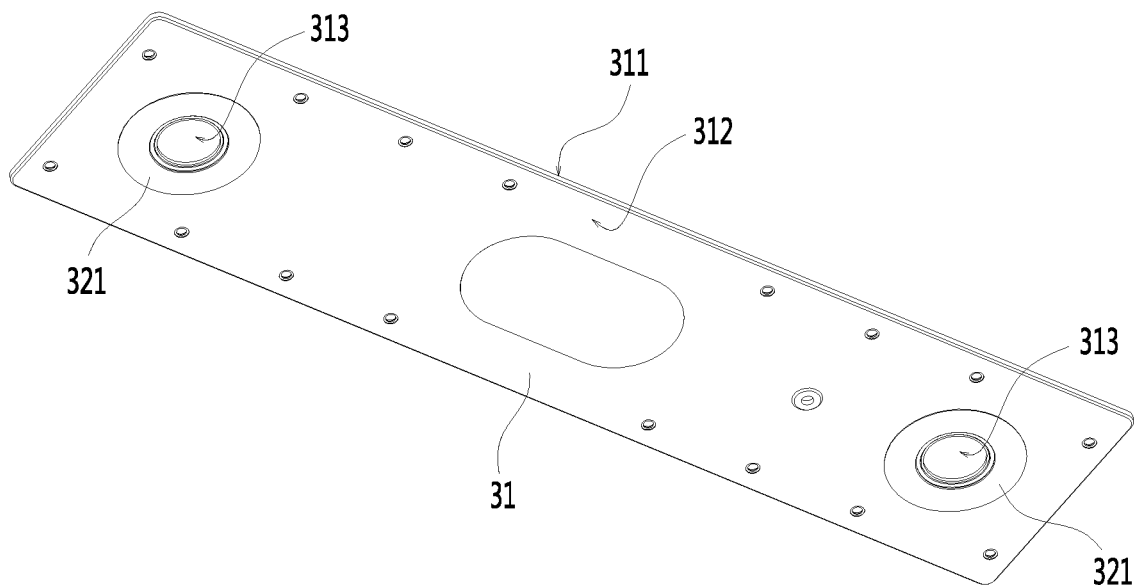
FIG. 7 is a bottom structural view of a cap plate according to an embodiment of the disclosure.
Figure 8:
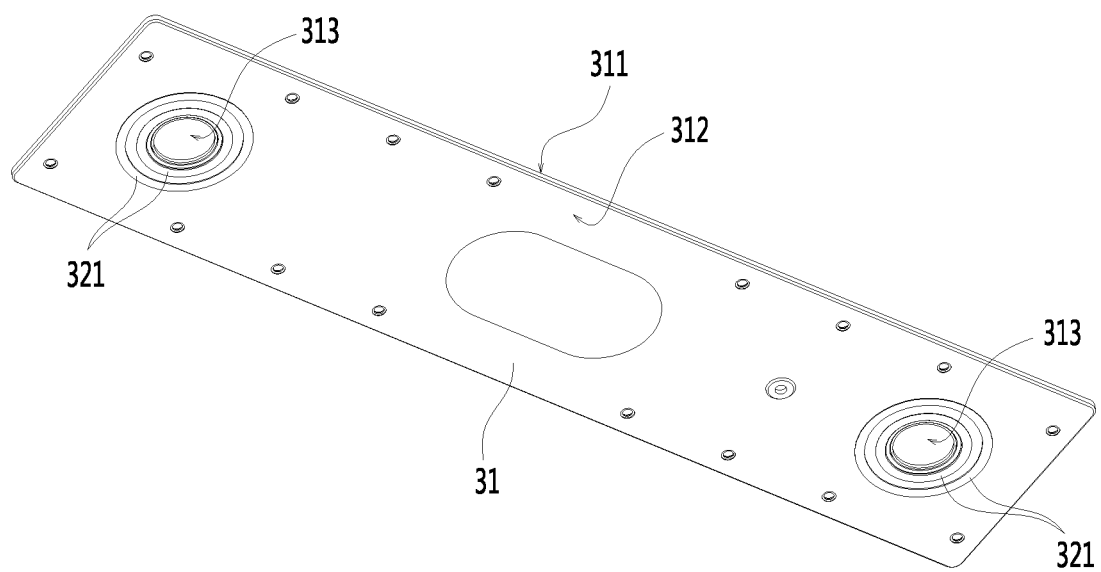
FIG. 8 is a bottom structural view of a cap plate according to another embodiment of the disclosure.
Figure 9:
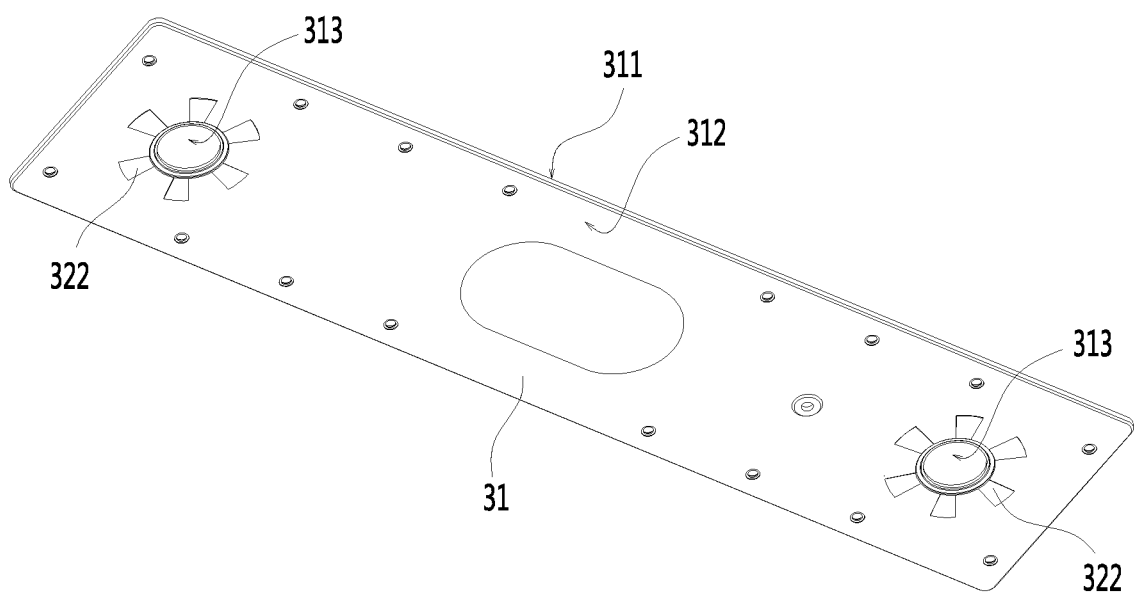
FIG. 9 is a bottom structural view of a cap plate according to another embodiment of the disclosure.

In one embodiment, the convex portion 32 includes a ring body 321 disposed around the electrode lead-out hole 313. The ring body 321 extends in the circumferential direction of the electrode lead-out hole 313. In one example, as shown in FIG. 7, there is one ring body 321. The ring body 321 and the main portion 31 may be integrally formed by a molding process. In another example, as shown in FIG. 8, there are two ring bodies 321. The two ring bodies 321 have different diameters. The ring body 321 with a smaller diameter among the two ring bodies 321 is disposed inside the ring body 321 with a larger diameter. The two ring bodies 321 may be arranged coaxially. The number of the ring bodies 321 is not limited to one or two, and may be three or more. Three or more ring bodies 321 may be arranged in the same way as the two ring bodies 321 shown in FIG. 8. The ring body 321 with a smaller diameter is disposed inside the ring body 321 with a larger diameter. In another embodiment, as shown in FIG. 9, the convex portion 32 includes two or more bosses 322. The two or more bosses 322 are provided at intervals in the circumferential direction of the electrode lead-out hole 313. The two or more bosses 322 are annularly distributed. In some embodiments, the two or more bosses 322 are evenly distributed along the circumferential direction of the electrode lead-out holes 313. The second surface 312 of the main portion 31 is smoothly transitioned and connected to an outer surface of the convex portion 32, thereby the stress concentration between the convex portion 32 and the main portion 31 in the transition region may be reduced.

Figure 10:
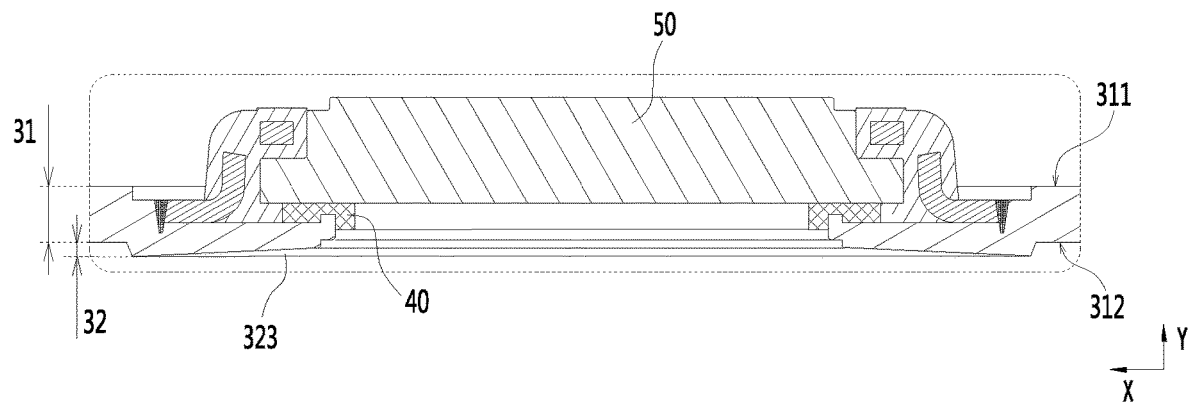
FIG. 10 is a partial sectional view of a structure of a cap assembly according to an embodiment of the disclosure.
Figure 11:
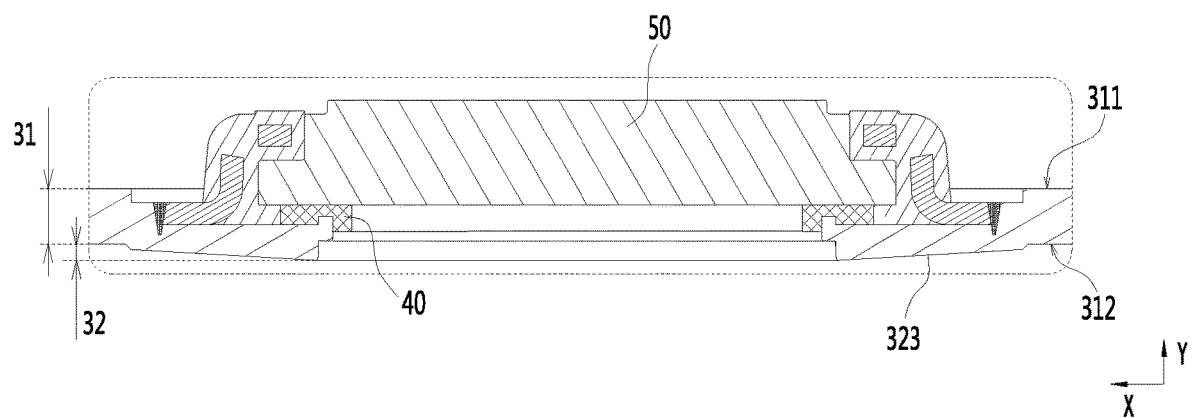
FIG. 11 is a partial sectional view of a structure of a cap assembly according to another embodiment of the disclosure.

In one embodiment, as shown in FIG. 5 or FIG. 6, the top surface 323 of the convex portion 32 may be generally a planar region. In another embodiment, as shown in FIG. 10, the top surface 323 of the convex portion 32 is generally a beveled region. The top surface 323 of the convex portion 32 is an inner side surface that faces an axis of the electrode lead-out hole 313. An outer edge of the top surface 323 of the convex portion 32 away from the axis of the electrode lead-out hole 313 is higher than its inner edge close to the axis of the electrode lead-out hole 313. As shown in FIG. 11, the top surface 323 of the convex portion 32 is generally a beveled region. The top surface 323 of the convex portion 32 is an outer side surface that is entirely opposite to the axis of the electrode lead-out hole 313. The outer edge of the top surface 323 of the convex portion 32 away from the axis of the electrode lead-out hole 313 is lower than its inner edge close to the axis of the electrode lead-out hole 313. In another embodiment, the top surface 323 of the protrusion 32 includes a planar region and a beveled region. A portion of the top surface 323 may be a planar region, and the remaining portion is a beveled region.

As shown in FIG. 3, the cap plate 30 includes a recess 33 surrounding the electrode lead-out hole 313. The recess 33 is recessed from the first surface 311 toward the second surface 312. The recess 33 includes a bottom wall 331 and a side wall connected to the bottom wall 331. The bottom wall 331 of the recess 33 is a surface closest to the second surface 312. The terminal assembly 50 is at least partially disposed within the recess 33 and covers the electrode lead-out hole 313. The fixing component 51 is in contact with the bottom wall 331 of the recess 33. Since the terminal assembly 50 is disposed in the recess 33, the structural compactness of the cap assembly 20 in the thickness direction is further improved. Thereby, when the cap assembly 20 according to the embodiment is applied to the secondary battery 10, the energy density of the secondary battery 10 may be further improved. The fixing component 51 is welded to the cap plate 30. As shown in FIG. 6, the fixing component 51 is welded to a portion of the cap plate 30 which forms the side wall of the recess 33, and forms a welding zone 99. The welding zone 99 has an innermost boundary close to the axis of the electrode lead-out hole 313 and an outermost boundary away from the axis of the electrode lead-out hole 313. In one example, along the radial direction X of the electrode lead-out hole 313, the convex portion 32 exceeds the welding zone 99 such that the outermost edge of the convex portion 32 exceeds the outermost boundary of the welding zone 99 and is arranged at outside of the outermost boundary of the welding zone 99. In this way, at one aspect, the convex portion 32 may reduce the possibility that the main portion 31 is melt through. At another aspect, after the welding zone 99 is formed, the structural strength of the region of the main portion 31 close to the welding zone 99 is reduced, and it is beneficial to provide the convex portion 32 to increase the structural strength of the region. In another example, along the radial direction X of the electrode lead-out hole 313, the convex portion 32 is flush with the outermost boundary of the welding zone 99 such that the outermost edge of the convex portion 32 is flush with the outermost boundary of the welding zone 99. Since the recess 33 is disposed on the cap plate 30, the region of the main portion 31 corresponding to the recess 33 is relatively thinned, such that the thickness of the region is relatively reduced in the thickness direction and thus the section of the main portion 31 corresponding to the recess 33 forms a cantilever structure. This section is relatively easily deformed when subjected to an external force in the axial direction Y of the electrode lead-out hole 313. The convex portion 32 connected to the main portion 31 is disposed corresponding to the recess 33 disposed on the main portion 31, so that the convex portion 32 may improve the deformation resistance of the section of the main portion 31 corresponding to the recess 33, and reduce the possibility that the section is deformed or broken when it is subject to an external force along the axial direction Y of the electrode lead-out hole 313.

In one embodiment, as shown in FIG. 6, the section of the main portion 31 outside of the recess 33 has a maximum thickness D. There is a maximum thickness H between the bottom wall 331 of the recess 33 and the top surface 323 of the convex portion 32, $0.4 \leq H/D \leq 0.9$, and $0.7 \text{ mm} \leq H \leq 1.5 \text{ mm}$. In one example, the section of the main portion 31 outside of the recess 33 is a structure with a uniform thickness. The portion of the main portion 31 outside of the recess 33 has a uniform thickness D at respective positions, i.e., a vertical distance from the first surface 311 to the second surface 312 is D. In another example, the main portion 31 includes a vent and a fluid inlet. In the axial direction Y of the electrode lead-out hole 313, an outer contour of a projection of the vent on the main portion 31 forms a first area, an outer contour of a projection of the fluid inlet on the main portion 31 forms a second area, and an outer contour of a projection of the recess 33 on the main portion 31 forms a third area. An outer contour of a projection of other sections of the main portion 31 outside of the recess 33, the vent and the liquid inlet forms a fourth area. The first area, the second area, and the third area are each smaller than the fourth area. The thickness of other sections of the main portion 31 outside of the recess 33, the vent and the liquid inlet is the maximum thickness D of the main portion 31.

In another embodiment, There is a maximum thickness H between the bottom wall 331 of the recess 33 and the top surface 323 of the convex portion 32, 0.7 mm≤H≤1.5 mm. In the embodiment, there is no proportional relationship between the value of the maximum thickness H and the value of the maximum thickness D of the section of the main portion 31 outside of the recess 33. The maximum thickness D of the section of the main portion 31 outside of the recess 33 may be flexibly selected so long as it may satisfy the thickness requirement.

Figure 12:
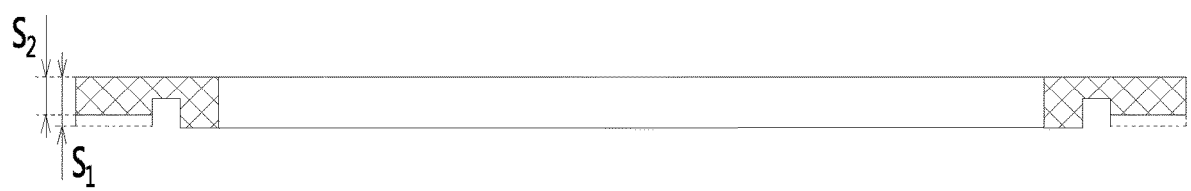
FIG. 12 is a structural sectional view of a sealing ring according to an embodiment of the disclosure.

In an embodiment, as shown in FIG. 2 and FIG. 6, a portion of the sealing ring 40 is disposed in the recess 33 to form a first sealing portion, and other portion is disposed outside of the recess 33 to form a second sealing portion. Both the first sealing portion and the second sealing portion are annular. Along the radial direction X of the electrode lead-out hole 313, an outer peripheral surface of the sealing ring 40 is arranged outside of an innermost edge 324 of the convex portion 32. The outer peripheral surface of the sealing ring 40 is arranged inside an outermost edge of the convex portion 32. The outer peripheral surface of the sealing ring 40 is a surface away from the axis of the electrode lead-out hole 313 but extending around the axis of the electrode lead-out hole 313. Along the axial direction Y of the electrode lead-out hole 313, a projection of the innermost edge 324 of the convex portion 32 is arranged within a projection of the first sealing portion. After the terminal assembly 50 is connected and fixed to the cap plate 30, the electrode terminal of the terminal assembly 50 and the cap plate 30 collectively press the first sealing portion of the sealing ring 40 in the axial direction Y of the electrode lead-out hole 313. Since the first sealing portion will produce an elastic restoring force when being compressed, the elastic restoring force acts on the section of the main portion 31 corresponding to the recess 33 such that the section will have a tendency to deform in the axial direction Y of the electrode drawing hole 313. After the convex portion 32 is disposed on the main portion 31, the convex portion 32 helps to enhance the deformation resistance of the section of the main portion 31 corresponding to the recess 33, and reduces the possibility that the section of the main portion 31 corresponding to the recess 33 is deformed or broken due to the elastic restoring force of the first sealing portion and thus reduces the possibility of seal failure. In one example, as shown in FIG. 12, the first sealing portion has a maximum compression S, and there is a maximum thickness H between the bottom wall 331 of the recess 33 and the top surface 323 of the convex portion 32, S=kH, and 0<k<1. Optionally, the maximum thickness H between the bottom wall 331 of the recess 33 and the top surface 323 of the protrusion 32 is in a range of 0.7 mm≤H≤1.5 mm. The larger an amount of compression of the first sealing portion, the larger the elastic restoring force of the first sealing portion. Thus, the maximum thickness between the bottom wall 331 of the recess 33 and the top surface 323 of the convex portion 32 will be correspondingly increased such that the elastic restoring force may be effectively counteract. The amount of compression refers to a ratio between a recoverable height of the first sealing portion in the axial direction Y when the first sealing portion returns from the compressed state to the free state and a height of the first sealing portion in the free state along the axial direction Y. The recoverable height is a difference obtained by subtracting a height $S_2$ of the first sealing portion in the compressed state along the axial direction Y from a height $S_1$ of the first sealing portion in the free state along the axial direction Y. That is to say, the recoverable height is equal to the difference between $S_1$ and $S_2$. S is equal to the ratio of the recoverable height to $S_1$.

Figure 13:
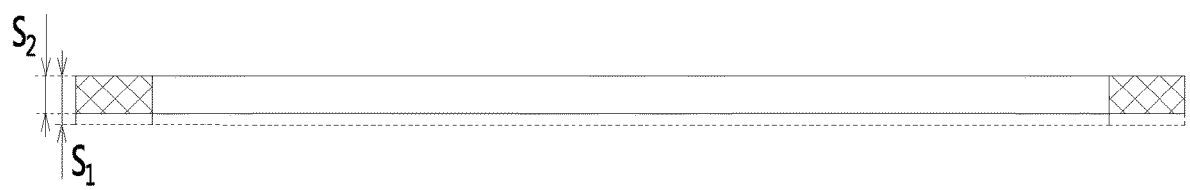
FIG. 13 is a structural sectional view of a sealing ring according to another embodiment of the disclosure.

In another embodiment, the sealing ring 40 is entirely disposed within the recess 33 of the main portion 31. After the terminal assembly 50 is connected and fixed to the cap plate 30, the extension portion 52a of the electrode terminal 52 and the cap plate 30 collectively press the entire sealing ring 40 in the axial direction of the electrode lead-out hole 313 to seal the electrode lead-out hole. Since the sealing ring 40 produces an elastic restoring force when being compressed, the elastic restoring force acts on the section of the main portion 31 corresponding to the recess 33 such that the section will have a tendency to deform in the axial direction of the electrode drawing hole 313. After the convex portion 32 is disposed on the main portion 31, the convex portion 32 helps to enhance the deformation resistance of the section of the main portion 31 corresponding to the recess 33, and reduces the possibility that the section of the main portion 31 corresponding to the recess 33 is deformed or broken due to the elastic restoring force of the first sealing portion and thus reduces the possibility of seal failure. In one example, as shown in FIG. 13, the sealing ring 40 has a maximum compression S, and there is a maximum thickness H between the bottom wall 331 of the recess 33 and the top surface 323 of the convex portion 32, S=kH, and 0<k<1. Optionally, the maximum thickness H between the bottom wall 331 of the recess 33 and the top surface 323 of the protrusion 32 is in a range of 0.7 mm≤H≤1.5 mm. The larger an amount of compression of the sealing ring 40 is, the larger the elastic restoring force of the sealing ring 40 will be. Thus, the maximum thickness between the bottom wall 331 of the recess 33 and the top surface 323 of the convex portion 32 will be correspondingly increased such that the elastic restoring force may be effectively counteract. The amount of compression refers to a ratio between a recoverable height of the sealing ring 40 in the axial direction Y when the sealing ring 40 returns from the compressed state to the free state and a height of the sealing ring 40 in the free state along the axial direction Y. The recoverable height is a difference obtained by subtracting a height $S_2$ of the sealing ring 40 in the compressed state along the axial direction Y from a height $S_1$ of the sealing ring 40 in the free state along the axial direction Y. That is to say, the recoverable height is equal to the difference between $S_1$ and $S_2$. S is equal to the ratio of the recoverable height to $S_1$.

In another embodiment, there is no recess 33 on the main portion 31. A portion of the sealing ring 40 is disposed between the extension portion 52a of the electrode terminal 52 and the main portion 31 to form a first sealing portion, and other portion is disposed outside of the extension portion 52a of the electrode terminal 52 and the main portion 31 to form a second sealing portion. After the terminal assembly 50 is connected and fixed to the cap plate 30, the electrode terminal 52 and the cap plate 30 collectively compress the first sealing portion of the sealing ring 40 in the axial direction Y of the electrode lead-out hole 313. Since the first sealing portion will produce an elastic restoring force when being compressed, the elastic restoring force acts on the main portion 31 such that the section of the main portion 31 corresponding to the first sealing portion will have a tendency to deform in the axial direction Y of the electrode drawing hole 313. After the convex portion 32 is disposed on the main portion 31, the convex portion 32 helps to enhance the deformation resistance of the section of the main portion 31 corresponding to the first sealing portion, and reduces the possibility that the section of the main portion 31 corresponding to the first sealing portion is deformed or broken due to the elastic restoring force of the first sealing portion and thus reduces the possibility of seal failure.

In another embodiment, the sealing ring 40 is entirely disposed between the extension portion 52a of the electrode terminal 52 and the main portion 31. After the terminal assembly 50 is connected and fixed to the cap plate 30, the extension portion 52a of the electrode terminal 52 and the cap plate 30 collectively compress the sealing ring 40 in the axial direction Y of the electrode lead-out hole 313. Since the sealing ring 40 produces an elastic restoring force when being compressed, the elastic restoring force acts on the main portion 31 such that the section of the main portion 31 corresponding to the sealing ring 40 will have a tendency to deform in the axial direction Y of the electrode drawing hole 313. After the convex portion 32 is disposed on the main portion 31, the convex portion 32 helps to enhance the deformation resistance of the section of the main portion 31 corresponding to the sealing ring 40, and reduces the possibility that the section of the main portion 31 corresponding to the sealing ring 40 is deformed or broken due to the elastic restoring force of the sealing ring 40 and thus reduces the possibility of seal failure.

Figure 14:
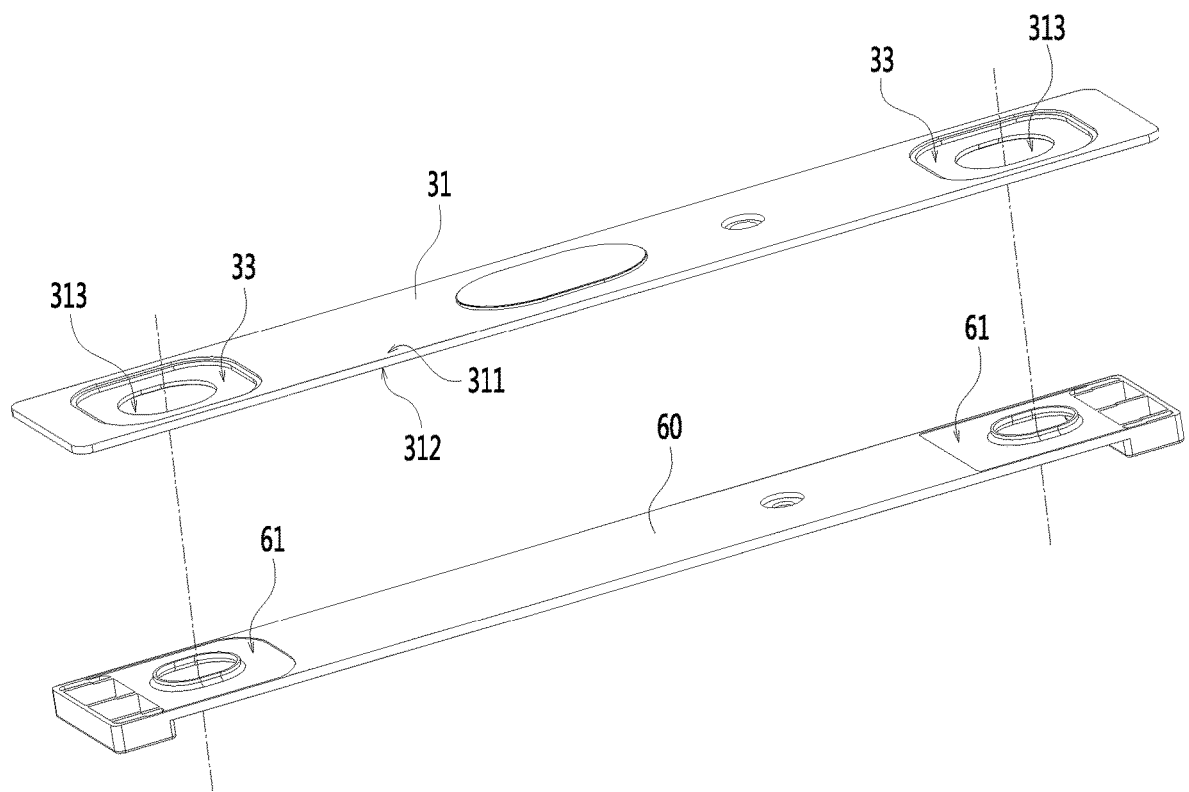
FIG. 14 is a partial exploded structural view of a cap assembly according to an embodiment of the disclosure.

As shown in FIG. 14, the cap assembly 20 further includes an insulating component 60. The insulating component 60 is disposed on a side of the second surface 312 away from the first surface 311. When the cap assembly 20 is applied to the secondary battery 10, the insulating component 60 may isolate the cap plate 30 and the electrode assembly 12. The insulating component 60 and the terminal assembly 50 are respectively disposed on two sides of the cap plate 30. The insulating component 60 includes a recessed portion 61 facing a surface of the cap plate 30. The convex portion 32 is at least partially arranged in the recessed portion 61. Thereby, in the axial direction Y of the electrode lead-out hole 313, the structural compactness between the insulating component 60 and the cap plate 30 may be improved, and thus the energy density of the secondary battery 10 may be improved. In an axial direction of the electrode lead-out hole 313, a lower surface of the electrode terminal 52 is higher than a lower surface of the insulating component 60. In some embodiments, the convex portion 32 is entirely arranged within the recessed portion 61, and the convex portion 32 and the recessed portion 61 are shaped to match each other. The number of the recessed portions 61 on the insulating component 60 is the same as the number of the convex portions 32, and the recessed portions 61 and the convex portions 32 are provided in one-to-one correspondence.

Figure 15:
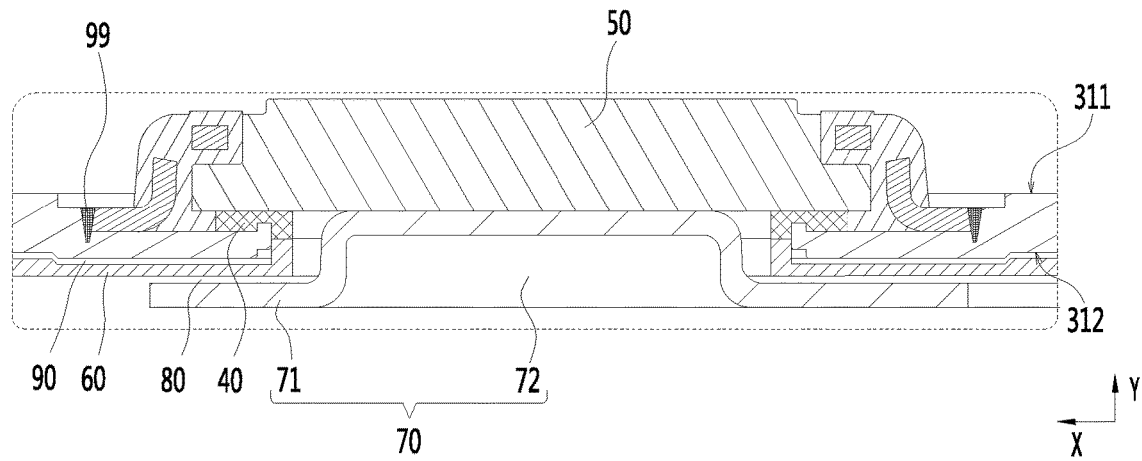
FIG. 15 is a partial sectional view of a structure of a secondary battery according to an embodiment of the disclosure.

As shown in FIG. 2 and FIG. 15, the secondary battery further includes a current collector 70 for connecting to the tabs. The current collector 70 includes a main body 71 and an extending portion 72 that are connected to each other. The main body 71 is arranged on a side of the insulating component 60 away from the second surface 312. The extending portion 72 extends into the electrode lead-out hole 313 and is connected to the electrode terminal 52. Along the axial direction Y of the electrode lead-out hole 313, there is a first gap 80 between the main body 71 and the insulating component 60; and/or along the axial direction Y of the electrode lead-out hole 313, there is a second gap 90 between the insulating component 60 and the cap plate 30. During the process of connecting the extension portion 72 of the current collector 70 to the electrode terminal 52, the following case will not happen: the main body 71 is interfered by the insulating component 60 such that there is poor contact between the extending portion 72 and the electrode terminal 52 or the connecting region between the extending portion 72 and the electrode terminal 52 is subjected to a large axial tensile force such that the extension portion 72 and the electrode terminal 52 will be easily disconnected. Therefore, the connection reliability of the extension portion 72 and the electrode terminal 52 is ensured.

An electric apparatus provided by an embodiment of this application includes a secondary battery 10.

Although the disclosure has been described with reference to some embodiments, various modifications may be made to the disclosure and components may be replaced with equivalents without departing from the scope of the disclosure. In particular, the technical features mentioned in the various embodiments can be combined in any manner as long as there is no structural conflict. The disclosure is not limited to the specific embodiments disclosed herein, but includes all technical solutions falling within the scope of the claims.

What is claimed is:

1. A cap assembly for a secondary battery, comprising:
   a cap plate comprising a main portion and a convex portion, wherein the main portion comprises a first surface and a second surface that are disposed opposite to each other in a thickness direction of the main portion and an electrode lead-out hole passing through the first surface and the second surface;
   an electrode terminal configured to connect to the main portion and cover the electrode lead-out hole, wherein the electrode terminal comprises an extension portion that is configured to extend beyond a hole wall of the electrode lead-out hole in a radial direction of the electrode lead-out hole, the extension portion is configured to extend in a circumferential direction of the electrode lead-out hole to form a ring structure, and the extension portion is arranged on a side of the first surface away from the second surface;
   a fixing component, wherein the electrode terminal is connected to the cap plate through the fixing component; and
   a sealing ring which is at least partially disposed between the extension portion and the main portion to seal the electrode lead-out hole,
   wherein the convex portion is disposed on the second surface and around the electrode lead-out hole, and a top surface of the convex portion is configured to extend out of the second surface,
   wherein the fixing component is configured to be welded to the cap plate and form a welding zone, and along the radial direction, the convex portion is configured to exceed the welding zone or the convex portion is configured to be flush with an outermost boundary of the welding zone,
   wherein the fixing component comprises a hollow cavity in which the electrode terminal is accommodated.

2. The cap assembly according to claim 1, wherein the convex portion comprises a ring body disposed around the electrode lead-out hole.

3. The cap assembly according to claim 1, wherein the top surface comprises a planar region and/or a beveled region.

4. The cap assembly according to claim 1, wherein the cap plate comprises a recess surrounding the electrode lead-out hole, the fixing component is configured to be welded to a side wall of the recess, a section of the main portion outside of the recess has a maximum thickness D, and there is a maximum thickness H between a bottom wall of the recess and the top surface, wherein $0.4 \leq H/D \leq 0.9$.

5. The cap assembly according to claim 4, wherein $0.7 \text{ mm} \leq H \leq 1.5 \text{ mm}$.

6. The cap assembly according to claim 4, wherein a portion of the sealing ring between the electrode terminal and the main portion has a maximum compression S, and there is a maximum thickness H between a bottom wall of the recess and the top surface, wherein S=kH, and 0<k<1.

7. The cap assembly according to claim 1, wherein the cap plate comprises a recess surrounding the electrode lead-out hole, the fixing component is configured to be welded to a side wall of the recess, and there is a maximum thickness H between a bottom wall of the recess and the top surface, wherein 0.7 mm≤H≤1.5 mm.

8. The cap assembly according to claim 1, wherein along the radial direction, an outer peripheral surface of the sealing ring is arranged outside of an innermost edge of the convex portion.

9. The cap assembly according to claim 1, wherein the second surface is smoothly transitioned and connected to an outer surface of the convex portion.

10. The cap assembly according to claim 1, wherein the cap assembly further comprises an insulating component disposed on a side of the second surface away from the first surface, the insulating component comprises a recessed portion in which the convex portion is at least partially arranged.

11. The cap assembly according to claim 10, wherein in an axial direction of the electrode lead-out hole, a lower surface of the electrode terminal is higher than a lower surface of the insulating component.

12. The cap assembly according to claim 1, wherein the convex portion comprises two or more bosses which are provided at intervals in the circumferential direction of the electrode lead-out hole.

13. The cap assembly according to claim 1, wherein the cap plate comprises a recess surrounding the electrode lead-out hole, the fixing component is configured to be welded to a side wall of the recess, a portion of the sealing ring between the electrode terminal and the main portion has a maximum compression S, and there is a maximum thickness H between a bottom wall of the recess and the top surface, wherein S=kH, and 0<k<1.

14. A secondary battery, comprising:
a case comprising an opening;
an electrode assembly disposed in the case; and
a cap assembly for sealing the opening comprising:
a cap plate comprising a main portion and a convex portion, wherein the main portion comprises a first surface and a second surface that are disposed opposite to each other in a thickness direction of the main portion and an electrode lead-out hole passing through the first surface and the second surface;
an electrode terminal configured to connect to the main portion and cover the electrode lead-out hole, wherein the electrode terminal comprises an extension portion that is configured to extend beyond a hole wall of the electrode lead-out hole in a radial direction of the electrode lead-out hole, the extension portion is configured to extend in a circumferential direction of the electrode lead-out hole to form a ring structure, and the extension portion is arranged on a side of the first surface away from the second surface;
a fixing component, wherein the electrode terminal is connected to the cap plate through the fixing component; and
a sealing ring which is at least partially disposed between the extension portion and the main portion to seal the electrode lead-out hole,
wherein the fixing component is configured to be welded to the cap plate and form a welding zone, and along the radial direction, the convex portion is configured to exceed the welding zone or the convex portion is configured to be flush with an outermost boundary of the welding zone,
wherein the fixing component comprises a hollow cavity in which the electrode terminal is accommodated, and
wherein the convex portion is disposed on the second surface and around the electrode lead-out hole, a top surface of the convex portion is configured to extend out of the second surface, and wherein the second surface is configured to face the electrode assembly.

15. The secondary battery according to claim 14, wherein the cap assembly further comprises an insulating component disposed on a side of the second surface away from the first surface, the secondary battery further comprises a current collector which comprises a main body and an extending portion connected to each other, the main body is arranged on a side of the insulating component away from the second surface, and the extending portion is configured to extend into the electrode lead-out hole and be connected to the electrode terminal;
wherein along an axial direction of the electrode lead-out hole, there is a first gap between the main body and the insulating component.

16. The secondary battery according to claim 15, wherein the convex portion comprises a ring body disposed around the electrode lead-out hole, or the convex portion comprises two or more bosses which are provided at intervals in the circumferential direction of the electrode lead-out hole.

17. The secondary battery according to claim 14, wherein the cap assembly further comprises an insulating component disposed on a side of the second surface away from the first surface;
wherein along an axial direction of the electrode lead-out hole, there is a second gap between the insulating component and the cap plate.

18. An electric apparatus, comprising a secondary battery, wherein the secondary battery comprises:
a case comprising an opening;
an electrode assembly disposed in the case; and
a cap assembly for sealing the opening comprising:
a cap plate comprising a main portion and a convex portion, wherein the main portion comprises a first surface and a second surface that are disposed opposite to each other in a thickness direction of the main portion and an electrode lead-out hole passing through the first surface and the second surface;
an electrode terminal configured to connect to the main portion and cover the electrode lead-out hole, wherein the electrode terminal comprises an extension portion that is configured to extend beyond a hole wall of the electrode lead-out hole in a radial direction of the electrode lead-out hole, the extension portion is configured to extend in a circumferential direction of the electrode lead-out hole to form a ring structure, and the extension portion is arranged on a side of the first surface away from the second surface;
a fixing component, wherein the electrode terminal is connected to the cap plate through the fixing component; and
a sealing ring which is at least partially disposed between the extension portion and the main portion to seal the electrode lead-out hole, wherein the fixing component is configured to be welded to the cap plate and form a welding zone, and along the radial direction, the convex portion is configured to exceed the welding zone or the convex portion is configured to be flush with an outermost boundary of the welding zone, wherein the fixing component comprises a hollow cavity in which the electrode terminal is accommodated, and wherein the convex portion is disposed on the second surface and around the electrode lead-out hole, a top surface of the convex portion is configured to extend out of the second surface, and wherein the second surface is configured to face the electrode assembly.

\* \* \* \* \*